United States Patent [19]

Bies

[11] Patent Number: 4,660,448

[45] Date of Patent: Apr. 28, 1987

[54] SOUND REDUCING MEANS

[76] Inventor: David A. Bies, 4 Parslow Road, Marion, South Australia, Australia, 5043

[21] Appl. No.: 881,526

[22] Filed: Jun. 30, 1986

Related U.S. Application Data

[63] Continuation of Ser. No. 488,001, May 2, 1983, abandoned, which is a continuation of Ser. No. 278,892, Jun. 29, 1981, abandoned, which is a continuation of Ser. No. 61,806, Jul. 30, 1979, abandoned.

[30] Foreign Application Priority Data

Aug. 11, 1978 [AU] Australia .................. PD5467

[51] Int. Cl.$^4$ .................. B26D 1/14; B26D 7/00
[52] U.S. Cl. .................. 83/13; 83/478; 83/860; 83/701; 30/376; 181/200; 181/205; 144/251 R; 144/252 R
[58] Field of Search .................. 83/13, 478, 701, 859, 83/860; 144/251 R, 252 R; 181/198, 200, 202, 205, 207; 30/376

[56] References Cited

U.S. PATENT DOCUMENTS

3,692,335  9/1972  Vickers et al. .................. 181/200 X
3,899,043  8/1975  Hall .................. 181/200

Primary Examiner—Robert P. Olszewski
Attorney, Agent, or Firm—Robert Louis Finkel

[57] ABSTRACT

The sound produced by the movement of the teeth of an idling circular saw or band saw blade in air is substantially reduced by exposing the blade to a radiation impedance which is effectively imaginary, thereby subjecting a preselected portion of such sound to propagation cut-off. Propagation cut-off is achieved by providing a cover including a pair of closely spaced parallel acoustically hard-wall plates positionable on both sides of the blade. Preferably the plates are spaced apart by a distance less than 21 millimeters, and extend beyond the tips of the teeth by a distance several times the space between the plates. Portions of the plates may be moveable to expose the teeth during the cutting operation.

11 Claims, 16 Drawing Figures

SOUND REDUCING MEANS

This is a continuation of co-pending application Ser. No. 488,001, filed on May 2, 1983, now abandoned which was a continuation of co-pending application Ser. No. 278,892, filed June 29, 1981 and now abandoned, which was a continuation of co-pending original application Ser. No. 61,806, filed July 30, 1979 and now abandoned.

BACKGROUND OF THE INVENTION

Field of the Invention

This invention relates to methods and means for the reduction of sound in certain industrial processes, for example in the use of high-speed saws. More particularly it contemplates a method and means for suppressing, as distinguished from attenuating, dissipating, or containing, the aerodynamic noise generated by a moving circular or band saw blade.

Extensive investigation has identified three principal sources contributing to the overall sound eminating from high-speed industrial saws, such as those used for cutting timber, metal parts and the like. These sources are structural vibration of the workpiece, structural vibration of the saw blade, and aerodynamic disturbances in the vicinity of the saw blade teeth.

When the teeth of the moving blade strike the workpiece during cutting, the latter may be driven in resonant response. This is especially true of long metal extrusions or extended sheets of metal or other structural materials. The noise emitted by the resonantly vibrating workpiece may be significant; however, the subject invention is not concerned with noise of this type.

Circular saw blades are known occasionally to emit a loud tone or "scream." This is due to excitation of a characteristic mode or vibration of the blade itself. A bending wave of this type may be induced in the blade during cutting by the resonantly responding workpiece and to a lesser extent by the striking of the teeth on the workpiece, or it may be induced in an idling blade by induced aerodynamic flow over the teeth. For purposes of this disclosure, blade noise will be distinguished from aerodynamic noise, and it will be understood that the term "idling noise" will be reserved for the aerodynamic noise, generally broad band in nature and distributed over one or more octaves depending upon the gullet depth-to-blade width ratio, associated with an idling circular or band saw blade.

Various means have been investigated and shown to be effective for the control of blade noise in circular blades. For example, internally damped laminated blades, damped air paths, and externally applied blade damping devices have all been used successfully and are commercially available. By contrast with circular saw blades, the excitation of resonant modes in a band saw blade probably very rarely if ever occurs, because the nature of the contact of the blade with the supporting wheels at the two ends of the blade loop is such as to insure good damping qualities. The subject invention is not specifically concerned with blade noise, but is believed to be of at least limited effect in controlling noise associated with this source.

The third principal source of noise is associated with unsteady airflow over each of the teeth as the blade moves through the surrounding air. This is the "idling noise" referred to earlier. The subject invention relates principally to the control of aerodynamic noise of this character.

Idling noise can be very loud, especially when the blade tip speed is high. Such noise can be of the order of 90 dBA or more, and since high-speed saws are commonly left running between cuts, can constitute a significant part of a workman's total noise exposure. It has long been recognized that even if the noise produced by vibration of the workpiece and by structural resonance of the saw blade could not be reduced, a distinct advantage in overall noise reduction would result if the aerodynamic noise of idling were successfully reduced. Considerable effort has been expended to achieve this end.

It is well known that substantial aerodynamic noise reduction can be achieved by using a smaller diameter saw blade or by reducing the rotational speed of the blade, thereby reducing the blade tooth speed. For example, measurement has shown that a reduction of 15 dBA may be achieved by a reduction of rotational speed from 3000 RPM to 1500 RPM. Unfortunately from the point of view of noise reduction, the practice in industry is to use large saws rotating at high speed. Accordingly, other means have been sought for the reduction of aerodynamic idling noise.

One prior art line of approach to the control of idling noise involves the modification of the saw tooth design. Appreciable noise reduction has been achieved with specially designed saw blades, but apparently always at the expense of cutting efficiency. By and large, efforts aimed at achieving an acceptable balance between noise abatement and cutting efficiency have been ineffectual.

Attempts such as those mentioned earlier to promote sound reduction by applying structure-damping means to the blade and its teeth predictably have met with little, if any, success for this purpose since idling noise as an aerodynamic phenomenon is substantially uneffected by the structural vibration of the blade itself.

Much effort has been expended in the development of various types of enclosures for containing the noisy source and attenuating and dissipating the trapped sound. U.S. Pat. Nos. 1,962,441, 3,586,122 and 3,863,617 all describe typical prior art enclosure means intended for these purposes. Several critical difficulties are encountered when such devices are adapted for use with high-speed saws.

To be effective, enclosures of this type must be acoustically sealed. The need for ready accessibility of the blade, however, makes this requirement difficult or impossible to meet. Even the least intrusive acoustical sealing mechanisms interfere intolerably with the repeated opening and closing of the enclosure when the saw is in use, and the sturdiest of them quickly fail under the wear and tear of such use. The prior art teaches that to be effective the walls of such an enclosure should be fairly widely spaced from the blade in order to avoid resonant build-up of the reverberant field. If the enclosure walls are too close to the sound source, the walls themselves can be strongly driven by the non-propagating near field. If reverberation is allowed, the local sound field within the enclosure at the enclosure walls can be significantly greater than the sound field would be at the same place without walls. Both effects increase the coupling of the source to the walls of the enclosure and thus decrease the sound-reducing capacity of the device. To minimize these effects some enclosures have been provided with internal damping materials. Unfortunately, the characteristics of such materials and the requirement for adequate spacing between the saw blade and the damping liner necessitate that the enclosure be much larger than is desirable or acceptable for industrial applications. Furthermore, the prevention of sound propagation through the walls of the enclosure requires that the walls be heavy, and excessive weight has proved to be an additional hindrance to the utilization of such devices.

A third problem encountered in the attempted use of a conventionally constructed enclosure for the control of idling noise is peculiar to the aerodynamic noise generating mechanism of the saw. Resonance effects may be encountered which significantly increase the generated noise when the rotating circular saw is enclosed. This phenomenon has led other researchers to abandon the enclosure approach altogether.

The subject invention avoids the problems and deficiencies associated with these prior art methods and devices by taking an entirely new approach to the reduction of aerodynamic noise. It does so not by modifying or damping the saw blade or by seeking means to contain, or dissipate or attenuate the noise generated aerodynamically, but rather by providing means which actually suppress the production of sound by the moving saw teeth. As will be seen, although primarily intended to minimize aerodynamic idling noise emanating from the teeth of the blade, the method and means of the subject invention are effective in reducing noise caused by resonant frequency vibration of the blade itself as well.

SUMMARY OF THE INVENTION

The coupling of a source of sound to the surrounding medium is described by its radiation impedance. The radiation impedance is a frequency-dependent function which describes the relationship between a pressure disturbance and the resulting particle motion in the surrounding medium. This interpretation describes the situation when aerodynamic sources are considered. Alternatively in the case of a vibrating surface it may be thought of as a function which describes the resulting pressure disturbance in the surrounding medium.

The radiation impedance is represented conventionally as a complex number the real part of which describes sound radiation and the imaginary part of which describes the cyclic storage and retrival of energy in the near field adjacent the source. When the radiation impedance is real, with no imaginary part, the source radiates all of its energy to the far field and no energy is stored in the near field. When the radiation impedance is imaginary, with no real part, the source radiates no energy, but merely cyclically transmits and receives energy stored in the near field in the medium adjacent the source. The local disturbance which the source creates decays very rapidly with distance from the source so that generally within a wavelength or less the resulting disturbance is quite negligible. One of the chief objects of my invention is the novel application of the principle of radiation impedance to eliminate, or at least greatly reduce the aerodynamic idling noise associated with high-speed industrial saws and similar noise-generating devices.

It is well known that if an obstruction is introduced into the smooth flow of air in a straight passageway, such as an air conditioning duct, the flow of air over and around the obstruction will result in unsteady forces of lift and drag on the obstruction. These forces result in an aerodynamic lift dipole with axis oriented normal to the centerline of the duct, and an associated drag dipole with axis oriented parallel with the centerline. In the case of a duct having a soft wall or absorbtive liner, the lift dipole will radiate sound at all frequencies. Such is not the case in a duct having an acoustically hard wall,. In such a duct the radiation impedance is imaginary and there exists a cut-off or "cut-on" frequency determined by the ratio of the duct width to wavelength, below which a lift dipole will not radiate sound. By contrast, a drag dipole will radiate sound in either duct at all frequencies. My invention relies on the characteristics exhibited by hard wall ducts, and for the purposes of this discussion only they will be considered.

For a two-dimensional duct with parallel hard walls spaced apart by a distance h, the cut-off frequency for lift dipole radiation is represented by the expression $$f = c/2h \qquad (1)$$

where c is the speed of sound in the medium contained in the duct. This equation implies that cut-off occurs when the duct is one-half wavelength wide.

At frequencies below cut-off, a lift dipole source would produce a local disturbance in the medium which would decay exponentially with distance along the duct. Thus, when the acoustician says that the source frequency is below cut-off he means that the disturbance does not propagate indefinitely unattenuated with the phase speed characteristic of the mode of propagation and the medium. Rather, since the radiation impedance is imaginary and the disturbance is everywhere in phase, i.e. has infinite phase speed, the disturbance decays quite rapidly with distance along the duct. In a matter of one or two duct-width-lengths along the duct the disturbance is quite negligible. It is important to note that in a very short duct such decaying non-propagating disturbance could in turn act as a source of sound at the duct exit. Thus it is apparent that a second, but less critical, dimension exists, namely, the length of a finite duct beyond the point of introduction of a lift dipole source below cut-off.

In my invention, I effectively position a rotating circular saw blade or translating band saw blade between two parallel acoustically hard wall plates. Most conveniently, I fashion these plates as the walls of a cover adapted to enclose all or a portion of the blade. Each of the blade teeth has a lift dipole associated with it oriented normal to the walls of the enclosure. By spacing the parallel walls of the enclosure part by a distance less than one-half of the wavelength of a predetermined frequency, these dipoles will all be below cut-off. By extending the parallel walls of the enclosure sufficiently beyond the tips of the blade teeth to expose the last vestiges of any decaying non-propagating disturbance to an imaginary impedance. I utilize the previously mentioned principles to insure that little if any lift dipole-associated aerodynamic sound is radiated.

While as noted earlier the orientation of the lift dipole between parallel plates in the case of a saw blade is analogous to the orientation of a lift dipole between the parallel walls of a duct, the orientation of the drag dipole is quite different in the two cases. In both the duct and the saw set between parallel plates, the drag dipole is oriented parallel to the direction of air flow, but whereas the direction of air flow in the duct is long its axial toward the duct exit, it is transverse to the exit in the case of the enclosed saw blade. With this orientation the drag dipoles associated with the saw teeth can likewise be expected to radiate at best very poorly or not at all. This is because one of the unique properties of a dipole is that while it radiates well in a direction parallel to its axis in free space, it radiates very poorly in a plane normal to its axis. In the case of the saw contained between hard wall rigid plates, all of the drag dipoles are oriented so that their planes of poorest radiation are radial. Thus a saw rotating between parallel closely-spaced rigid plates may be expected to produce little if any aerodynamic noise. I have confirmed this expectation experimentally.

My experiments have also provided some insight into the phenomenon of resonance. When a circular saw is placed in an enclosure, while not conclusive, they strongly suggest that factors involving a "new" noise mechanism are introduced that apparently have not previously been recognized or investigated. This noise source appears to be associated with a modification of the natural convection of air at the surface of the saw blade, due to the pumping action of the rotating saw disk.

It is well known that a disk with a smooth surface and perimeter, rotating about its axis in free space, will induce a steady axial flow inward toward the disk along its axis of rotation and radially outward across the face of the disk. This phenomenon has been investigated by others and has been shown to be a source of aerodynamic noise in the case of exposed disks. Presumably the noise from this source would constitute the minimum noise that could be expected from an unenclosed saw, if all of the noise due to the flow disturbance of the teeth could be eliminated. The induced flow across the blade face probably represents only a minimal additional contribution to the idling noise generation associated with the mechanism discussed earlier; however, there is a distinct possibility that by positioning the blade between the closely spaced plates of my invention, such induced circulation can be inhibited to suppress this source of noise as well.

For a more complete understanding of how my invention takes advantage of the peculiar properties of a dipole generating source to render the radiation impedance imaginary by appropriate choice of the geometry of an enclosure, attention is directed to the following detailed description of the several preferred embodiments of the invention illustrated in the accompanying drawing in which:

THE DRAWING

Wherever practicable, like numerals are used to identify the same or functionally similar components in the several views.

DETAILED DESCRIPTION

Figure 1:
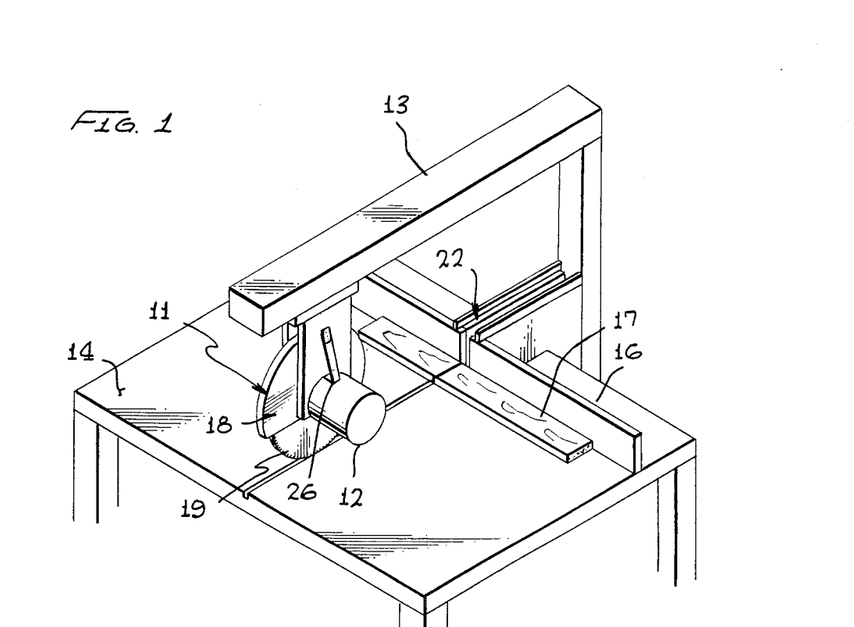
FIG. 1 is a perspective view of a typical cut-off saw having a blade guard embodying the subject invention.

Referring to FIG. 1, a conventional cut-off saw 11, powered by motor 12, is mounted to fixed arm 13 for reciprocating motion across table 14. A fence 16 is secured to the top of the table and serves as a back-stop for the material, such as board 17, being cut.

Figure 2:
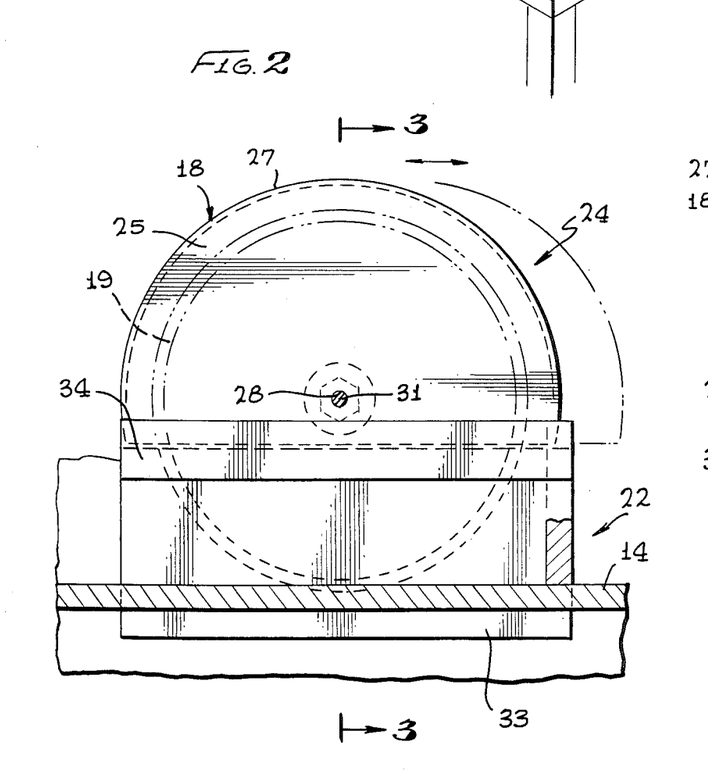
FIG. 2 is a side elevational view of the blade guard illustrated in FIG. 1 with the saw in its idling position. The saw table, arm and table top have been omitted for clarity.
Figure 3:
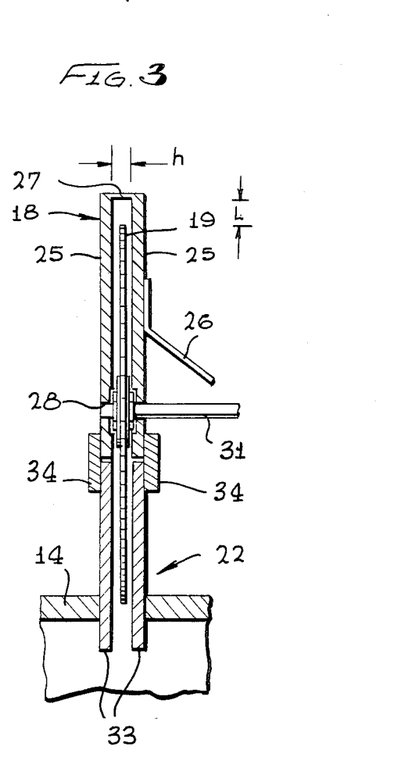
FIG. 3 is a sectional view of the blade guard of FIG. 2 taken in the direction 3—3.
Figure 4:
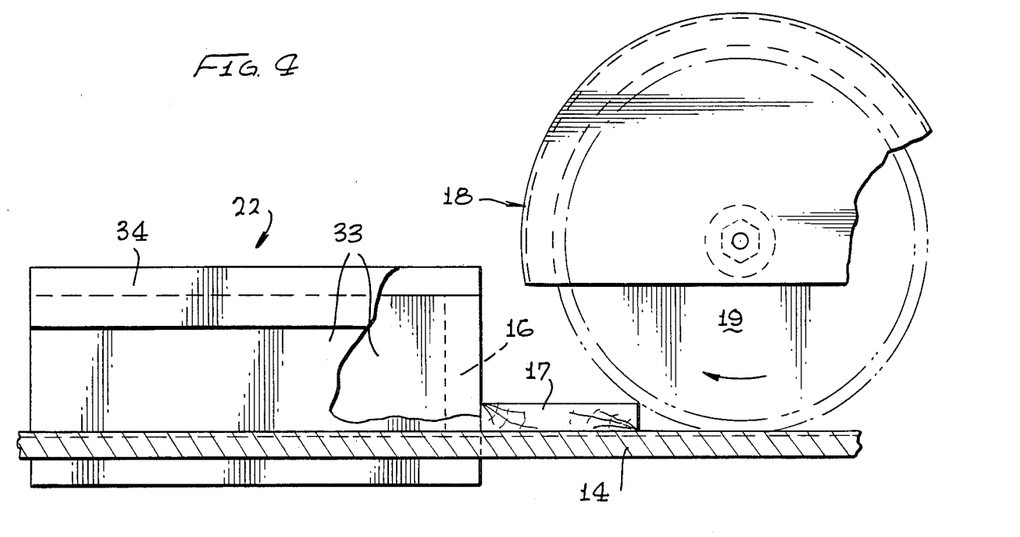
FIG. 4 is a partially cut-away side elevational view of the guard of FIG. 2 with the saw in its open, cutting position.
Figure 5:
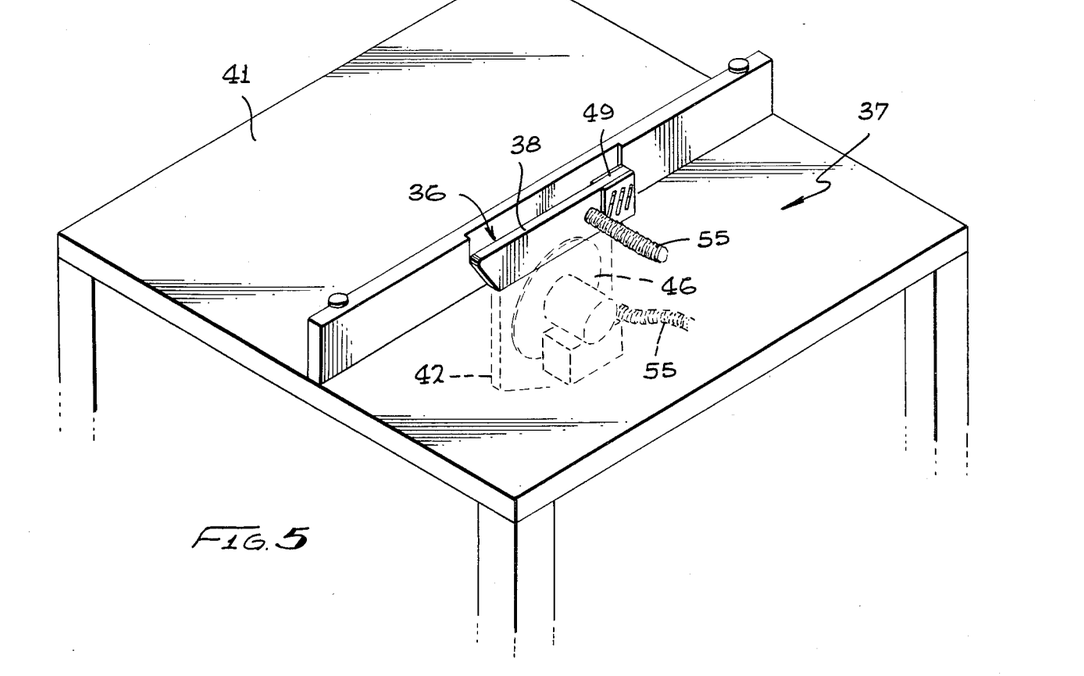
FIG. 5 is a perspective view of a typical table saw having a blade guard embodying the subject invention.

The subject invention comprises an upper housing 18 mounted to motor 12 and enclosing at least the upper portion of circular saw blade 19, and lower housing 22 mounted to table 14 and positioned to receive and enclose blade 19 when the saw 11 is idling. As will be seen, the placement of lower housing 22 is a matter of choice, the chief consideration being the selection of a convenient location which will afford maximum access to the work area of table 14 without interference from either the housing 22 or the saw 11 itself. By way of example, if desired housing 22 could be positioned at the front of table 14. FIGS. 2-4 illustrate more clearly the construction and function of the acoustical saw blade guard 24 defined by the housings 18 and 22.

Upper housing 18 is formed to include a pair of spaced substantially parallel side walls or plates 25 which, when the housing is mounted to saw 11 by conventional means such as mounting bracket 26, are maintained rigidly on opposite sides of and extend radially outwardly of the periphery of blade 19. Plates 25 may be of any suitable acoustically "hard" material, even wood or particle board; however, considerations of safety, utility, durability, and simplicity of manufacture suggest the use of lightweight cast or rolled metal or molded high-impact plastic, or the like. Preferably, although not necessarily, the periphery 27 of upper housing 18 is closed to prevent sawdust, particles and chips from being thrown outwardly when the saw is cutting. Clearance recesses and holes 28 are provided as necessary for drive shaft 31 and the mandrel in the fastening nuts and washers which secure the blade 19 to it. I have found it advantageous, although not critical to the effectiveness of the invention, to peak clearance holes 28 with acoustical sealing material.

Lower housing 22 is formed to include a pair of substantially parallel side walls or plates 33 spaced to register with plates 25 of upper housing 18 when the saw 11 is "parked" in the idling position shown in FIG. 2. The housings 18 and 22 may be adapted so that the adjacent edges of their respective plates 25, 33 are in tight sliding contact. I have found it preferable to provide a small clearance between upper and lower plates 25, 33 and to seal the gap between them with sliding seals 34. These seals 34 may be extensions of the material of which the plates 33 are made. As with plates 25, plates 33 are sized to extend some distance radially outwardly of the periphery of blade 19 when saw 11 is in its lowest position. Seals 34 permit the saw to be raised or lowered to adjust the cutting depth without exposing the gap between plates 25, 33.

In applying the principle embodied in equation (1) to determine the optimum spacing h between the inner walls of plates 25, 33, I have made certain assumptions concerning the nature of the aerodynamic noise produced by an idling saw. While such noise is broad in its frequency content, it is dominated by components in the middle of its range. Away from the mid-range at either lower or higher frequencies the components become progressively less harmful to the human ear and, therefore, less important for the purposes of my invention. On reviewing the data presented by others in the field and after considerable experimentation, I have concluded that most saws will not have significant acoustic energy in the octave band above the 8 kHz one-third octave band. The upper bound for this frequency band is 8.9 kHz. It would appear, therefore, that the highest frequency with which we need realistically be concerned is about 9 kHz. Applying this assumption to equation (1) and taking 344 m/sec as the speed of sound in air at ordinary temperatures (20° C.), the plate spacing h for cut-off of the aerodynamic dipole energy generated by the moving saw teeth should be 19.1 mm. Since the last millimeter is probably not critical and 9 kHz is probably higher than necessary, I have chosen about 20 mm as the upper bound of the optimum range of plate spacings.

It should be pointed out that the foregoing analysis is a conservative one. If instead of 9 kHz a frequency of 8 kHz were selected as the upper limit of the noise to be controlled, the upper bound of the optimum spacing between the plates 25, 33 as shown by equation (1) would be 21.5 mm.

Regardless of the upper limit chosen, experimentation has demonstrated that when the spacing between plates 25, 33 is reduced to about 7 mm almost all audible aerodynamic noise generated by blades operating at speeds up to 5,000 rpm is eliminated. For practical reasons, such as blade clearance and sawdust, particle and chip elimination (about which more will be said below) I have selected about 10 mm as the lower limit of the optimum spacing range.

As mentioned earlier, the lift dipoles generated by the saw teeth will not radiate sound if the parallel walls of the acoustical enclosure extend sufficiently beyond the periphery of the blase. I have determined through experimentation that the minimum extension or overlap L required to insure substantially complete decay of the radiated dipoles is about one and one-half times the spacing h between the parallel walls of the blade enclosure or, in mathematical terms, $$L_{min} \leq 1.5 h_{cut-off}. \qquad (2)$$

Extending the walls of the guard 24 substantially beyond the distance $L_{min}$ appears to have no influence on the sound reduction characteristics of the invention. Experimental results suggest that by employing equations (1) and (2) in the construction of acoustical guards of the type described herein, the reduction in dBA, $N_{dBA}$, of aerodynamic idling noise produced by a circular saw blade is represented by the expression $$N_{dBA} = 19 - 0.35 h \qquad (3)$$

FIGS. 5–8 illustrate an acoustical guard 36, built in accordance with the aforementioned principles, applied to a table saw 37. In this instance the guard 36 includes an upper housing 38 movably mounted to the table 41, and a fixed lower portion 42 secured to the underside of the table 41. Housings 38, 42 are constructed of materials and in a manner similar to housings 18, 22 of the previously described embodiment with closely spaced rigid side walls or plates 44 and 45, respectively, containing and extending beyond the tips of the teeth of blade 46. To allow for vertical adjustment of the saw, clearance slots 47 are provided in side walls 45.

Figures 6, 7, 8:
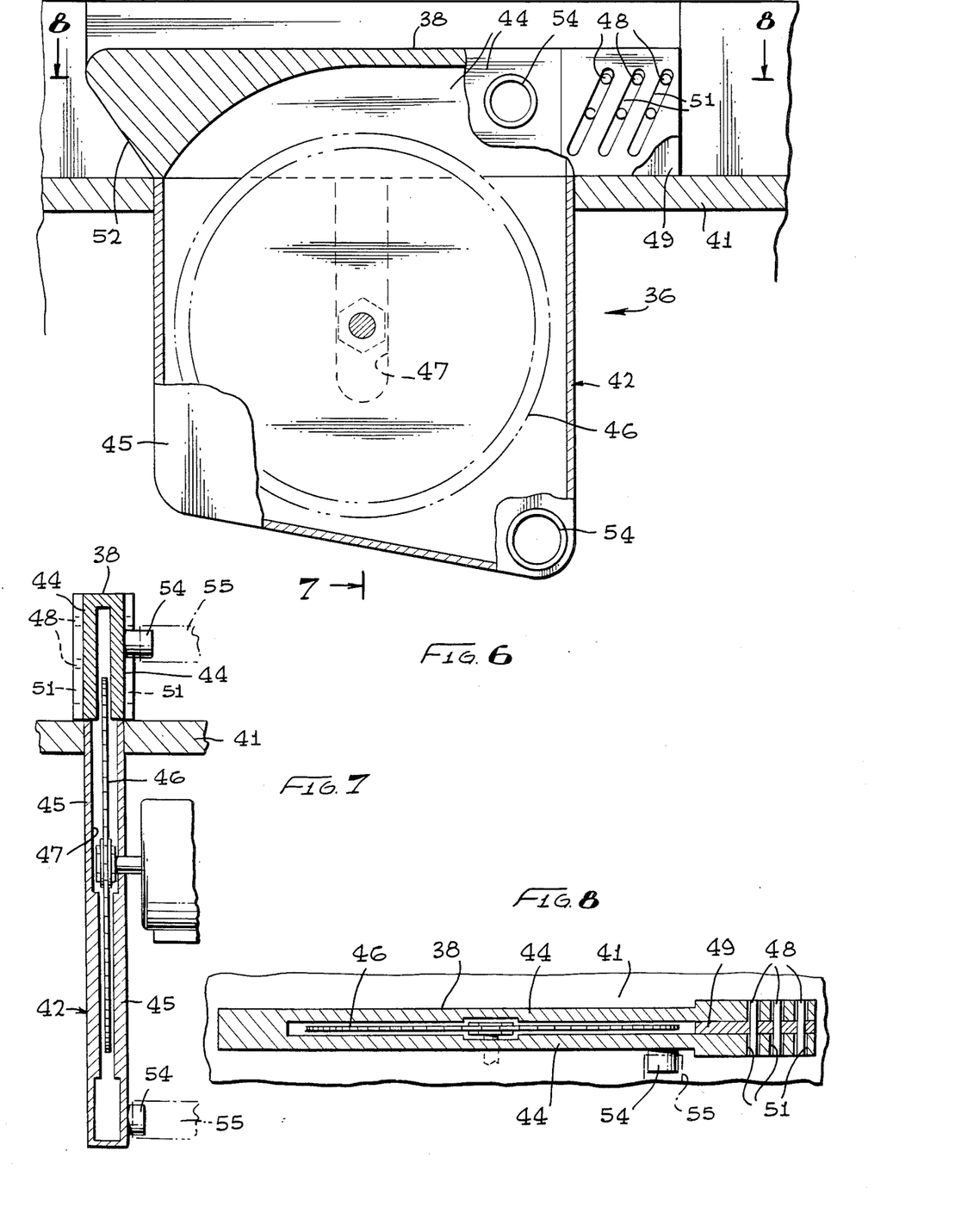
FIG. 6 is a partially cut-away side elevational view of the blade guard illustrated in FIG. 5 with the saw in its idling position.
FIG. 7 is a sectional view of the guard of FIG. 6 taken in the direction 7—7.
FIG. 8 is a sectional view of the guard of FIG. 6 taken in the direction 8—8.

Upper housing 38 is mounted by conventional means, such as pins 48 passing through the support 48 fixed to table top 41 and slidably engaging slots 51 formed at the rear end of housing 38, which allows housing 38 to be raised from the surface of table 41 upwardly and rearwardly, thereby exposing saw blade 46 when the workpiece is forced against its curved forward end 52.

In addition to its marked ability to reduce aerodynamic noise, the subject invention has demonstrated a second and highly advantageous charactersistic. The containment of the blade 46 in the narrow space between plates 44 and 45 imparts a high velocity tangential airflow which, when vented through ports 54 and ducts 55, produces a highly efficient debris removal system.

Figures 9, 10, 11:
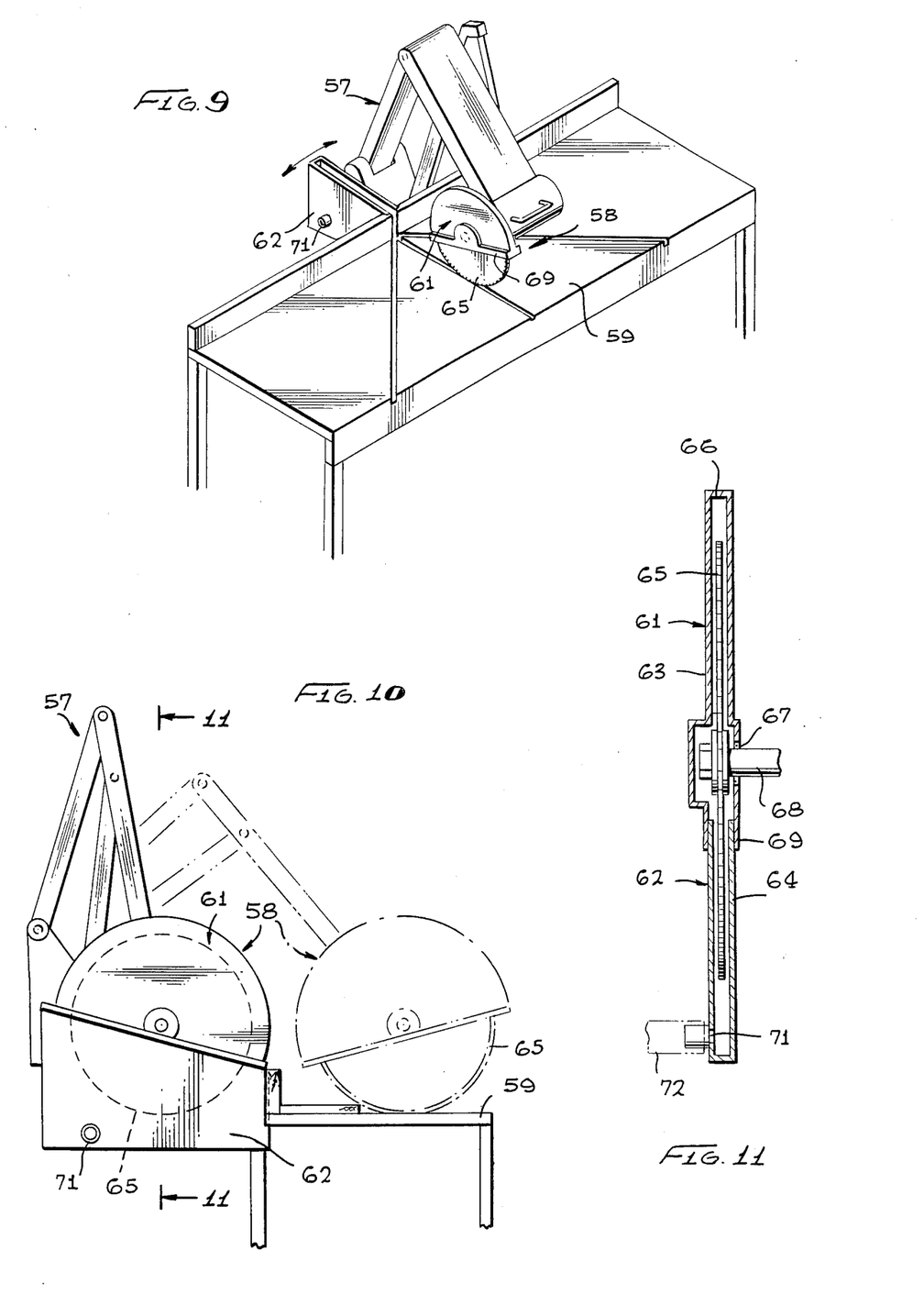
FIG. 9 is a perspective view of a typical swing saw having a blade guard embodying the subject invention.
FIG. 10 is a simplified side elevational view of the blade guard illustrated in FIG. 9 showing in phantom the guard with the blade in its open, cutting position. The parallel motion mechanism is shown schematically for clarity.
FIG. 11 is a sectional view of the guard of FIG. 10 taken in the direction 11—11.

Swing saws of the type shown in FIG. 9 are in common use, especially in the metals industries. As shown in FIG. 10, parallel motion mechanism 57 effectively maintains the axis of rotation of saw 58 in a fixed horizontal plane while the saw moves across cutting table 59. Mechanism 57 is likewise rotatable about a vertical axis for diagonal cutting. Upper housing 61 of the acoustical guard is secured in place over the upper portion of blade 62 and lower housing 62 is mounted to the rotatable mechanism 57 adjacent table 59, so that it moves with saw 58 as the latter pivots about its vertical axis of rotation. The particular method of positioning and mounting housing 62 are not shown in detail, but are matters of conventional practice.

As best seen in FIG. 11, the acoustical guard for this type of saw includes upper housing 61 and lower housing 62 having spaced rigid walls or plates 63, 64, respectively, enclosing the blade 65 when the saw 58 is parked in its idling position. Preferably upper housing 61 is closed around its upper periphery 66 and is provided with an acoustical seal 67 surrounding shaft 68 where it passes through wall 63. As in the case of the cut-off saw acoustical guard, a sliding seal 69 is provided to facilitate the parking of the saw 58 and eliminate an undesirable air gap between housings 61 and 62.

By enclosing the bottom and rear side of lower housing 62, the tangential airflow mechanism referred to in connection with the previously described embodiment of the acoustical guard may be utilized to entrain and remove the dust, particles and chips produced during cutting. A port 71 and duct 72 may be provided to carry the airborne debris to a conveniently placed receptacle (not shown).

Figure 12:
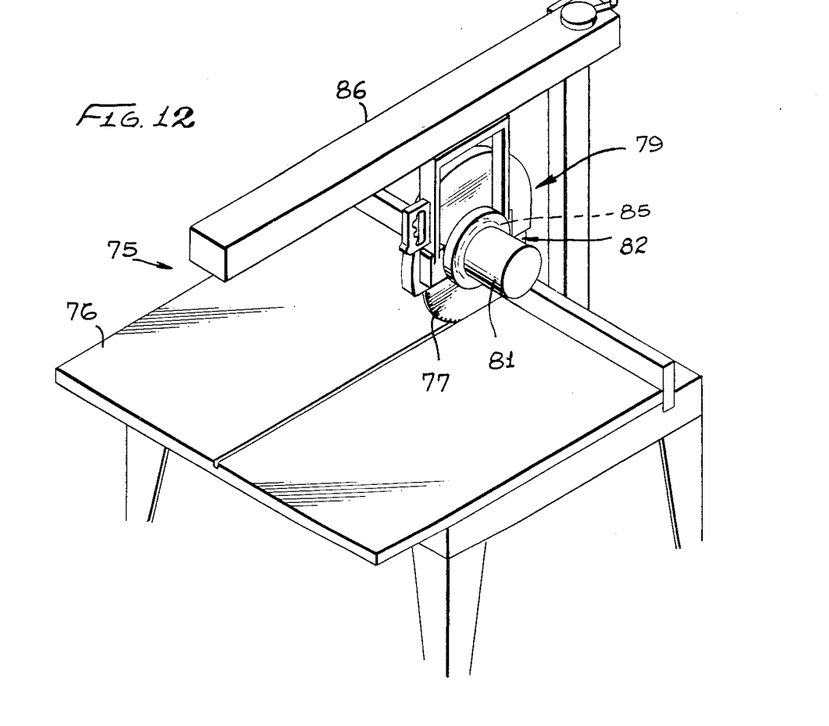
FIG. 12 is a perspective view of a typical radial arm saw having a blade guard embodying the subject invention.
Figure 13:
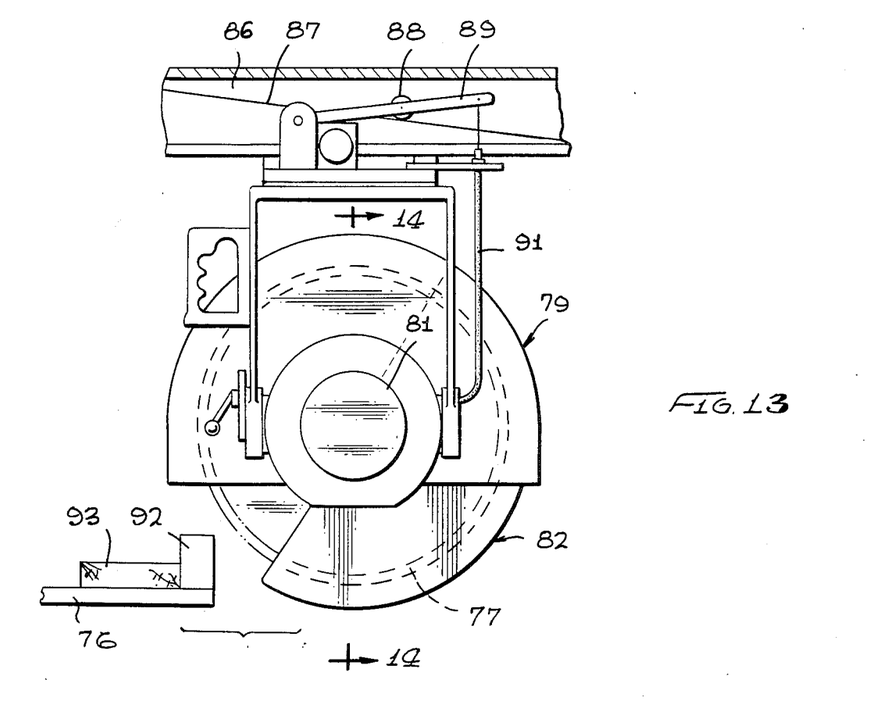
FIG. 13 is a side elevational view of the guard of FIG. 12 as seen from the right side of the saw of FIG. 12.
Figures 14, 15, 16:
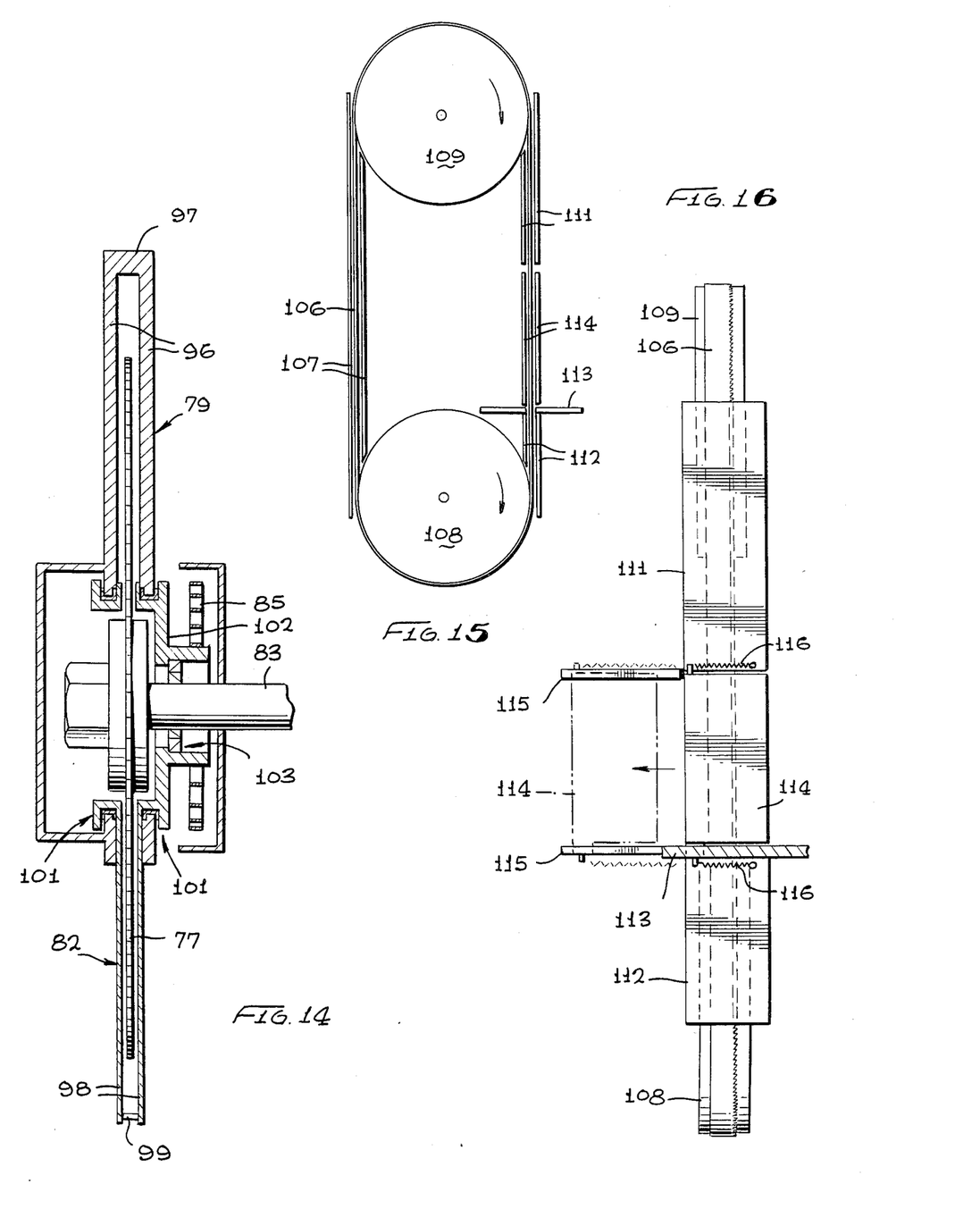
FIG. 14 is a sectional view of the guard of FIG. 13 taken in the direction 14—14.
FIG. 15 is a side elevational view of the blade mounting wheels and blade of a typical band saw having a blade guard embodying the subject invention.
FIG. 16 is a front elevational view of the guard of FIG. 15.

FIGS. 12-14 illustrate an embodiment of the acoustical guard of the subject invention adapted for use with a radial arm saw 75 having three degrees of freedom of movement which must be accommodated. One solution to this problem is illustrated in FIGS. 13 and 14. In this embodiment the upper housing 79 is mounted to the motor 81 and lower housing 82 is mounted coaxially with the saw blade 77 and adapted to rotate within upper housing 79.

A spiral spring 85 is connected between fixed upper housing 79 and lower housing 82 and urges housing 82 toward its closed position fully enclosing blade 77 (clockwise in FIG. 13). A cam profile 87 formed on radial arm 86 serves as a ramp for cam follower 88 which is mounted to upper guard 79 by means of cam profile multiplier arm 89. The free end of arm 89 is connected to the movable lower housing 82 by means of a Bowden cable 91 adapted to open lower housing 82, exposing blade 77, in response to the displacement of cam follower 88 as it rides up ram 87 when the saw is drawn out of its parked position at the rear of table 76 and pulled into its cutting position near the front of the table (toward the left in FIG. 13). By careful selection of the profile of cam 87 and the length of multiplier arm 89 the rotation rate of lower housing 82 may be controlled to prevent housing 82 from contacting stop 92, workpiece 93 and table 76, while at the same time minimizing the uncovered portion of blade 77.

As seen more clearly in FIG. 14 the walls 96 of upper housing 79 are sealed around their periphery 97 and are somewhat more widely spaced than the walls 98 of lower housing 82 to provide space for the latter when it is in its open position. Lower housing 82 may be closed around its outer edge or left open except for spacers 99, as shown in FIG. 14, to prevent the accumulation of cutting debris. As in all of the previously described embodiments, walls 96 are spaced apart no more than about 21.5 millimeters and extend beyond the tips of the blade 77 a distance of at least one and one-half times their spacing. Likewise, as in the previous embodiments, sliding acoustical seals 101 are provided to eliminate an undesirable air gap between upper housing 79 and lower housing 82, and the space between lower housing hub 102 and shaft 83 is provided with an acoustical seal 103.

The noise of large industrial band saws has not been investigated in depth, but preliminary investigation has shown that aerodynamic noise due to flow disturbance over the teeth is the major contributor. FIGS. 15 and 16 illustrate the essential features of a band saw blade acoustic guard embodying the principles of my invention. In this embodiment the blade 106 is contained between closely spaced parallel rigid plates 107 preferably covering the entire span of blade 106 between wheels 108, 109. On the forward or table side of the saw most of the downwardly moving blade 106 is contained between similar fixed closely spaced parallel rigid plates 111, 112. In the cutting region above table 113 a section 114 of the acoustical guard is adapted by suitable conventional means (such as laterally extending guides 115 and return springs 116) to expose blade 106 during the cutting operation. Alternatively, the section 114 can pivot rearwardly and upwardly about a horizontal axis.

As with the previous embodiments of the invention, fixed plates 107, 111 and 112 and the movable plates 117 in movable section 114 are spaced apart, respectively, a distance equal to one-half of the wavelength of the highest frequency for which noise reduction is required, in accordance with equation (1), and plates 107, 111, 112 and 117 extend beyond the tips of the teeth of blade 106 a distance at least equal to seventy-five percent of that wavelength, in accordance with equation (2).

It should be understood that the particular construction and function of the embodiments described in detail herein were chosen to illustrate several preferred embodiments of the invention and are not to be deemed as limitations on the scope of the invention as defined in the following claims.

As my invention I claim:

1. A method for suppressing a portion of the aerodynamic idling noise produced by the moving saw blade of a high-speed industrial saw, said portion lying in the band of audible frequencies bounded at its upper end by some selected frequency and deemed to be harmful to human hearing, said method comprising effectively exposing the saw blade, at idle, to a radiation impedance which is soley imaginary, thereby subjecting the audible noise below said selected frequency to cut-off.

2. The method of claim 1 wherein the saw blade is exposed to an imaginary radiation impedance by effectively containing said blade, at idle, between a pair of imperforate acoustically hard walls positioned immediately adjacent the opposite sides of and co-extensive with said blade, said walls being parallel throughout their entire area, parallel to the direction of motion of said blade and spaced apart a distance not greater than one-half of the free field wavelength of a plane propagating acoustic wave in said medium at said selected frequency, and extending beyond the periphery of said blade a distance not less than one and one-half times the distance between said walls.

3. The method of claim 1 wherein the saw blade is exposed to an imaginary radiation impedance by effectively containing said blade, at idle, between a pair of imperforate acoustically hard walls positioned immediately adjacent the opposite sides of and co-extensive with said blade, said walls being parallel throughout their entire area, parallel to the direction of motion of said blade and spaced apart a distance of from about 21.5 millimeters to about 7 millimeters, and extending beyond the periphery of said blade a distance not less than one and one-half times the distance between said walls.

4. The method of claim 1 wherein the saw blade is exposed to an imaginary radiation impedance by effectively containing said blade, at idle, within an acoustical guard comprising:

a first pair of imperforate acoustically hard walls associated with said saw positioned immediately adjacent the opposite sides of and coextensive with at least a first portion of said blade, said first pair of walls being parallel throughout their entire area, parallel to the direction of motion of said blade and spaced apart a distance not greater than one-half of the free field wavelength of a plane propagating acoustic wave in said medium at said selected frequency, and extending beyond the periphery of said blade a distance not less than one and one-half times the distance between said walls, whereby audible noise below said selected frequency is subjected to cut-off;

a second pair of imperforate acoustically hard walls parallel throughout their entire area and spaced apart a distance not greater than one-half of the free field wavelength of a plane propagating acoustic wave in said medium at said selected frequency, said second pair of walls being positionable immediately adjacent opposite sides of said blade, coextensive with the remaining portion of said blade, oriented substantially parallel to said first pair of walls, and extending beyond the periphery of said blade a distance not less than one and one-half times the distance between said walls, whereby audible noise below said selected frequency is subjected to cut-off; and means associated with said saw for so positioning said second pair of walls.

5. The method of claim 4 wherein each of said first and second pairs of walls are spaced apart a distance of from about 21.5 millimeters to about 7 millimeters.

6. An acoustical guard for suppressing a portion of the aerodynamic idling noise produced by the moving saw blade of a high-speed industrial saw, said portion lying in the band of audible frequencies bounded at its upper end by some selected frequency and deemed to be harmful to human hearing, said guard comprising:

a first pair of imperforate acoustically hard walls associated with said saw positioned immediately adjacent the opposite sides of and coextensive with at least a first portion of said blade, said first pair of walls being parallel throughout their entire area, parallel to the direction of motion of said blade and space apart a distance not greater than one-half of the free field wavelength of a plane propagating acoustic wave in said medium at said selected frequency, and extending beyond the periphery of said blade a distance not less than one and one-half times the distance between said walls, whereby said blade is exposed to a radiation impedance which is imaginary and audible noise below said selected frequency is thereby subjected to cut-off;

a second pair of imperforate acoustically hard walls parallel throughout their entire area and spaced apart a distance not greater than one-half of the free field wavelength of a plane propagating acoustic wave in said medium at said selected frequency, said second pair of walls being positionable immediately adjacent opposite sides of said blade, coextensive with the remaining portion of said blade, oriented substantially parallel to said first pair of walls, and extending beyond the periphery of said blade a distance not less than one and one-half times the distance between said walls, wherein said blade is exposed to a radiation impedance which is imaginary and audible noise below said selected frequency is thereby subjected to cut-off; and means associated with said saw for so positioning said second pair of walls.

7. The acoustical guard of claim 6 wherein each of said first and second pairs of walls are spaced apart a distance of from about 21.5 millimeters to about 7 millimeters.

8. A high-speed industrial saw, comprising:

a saw blade producing aerodynamic idling noise in the band of audible frequencies bounded at its upper end by some selected frequency and deemed to be harmful to human hearing; and a first blade guard element mounted to said saw, said first element including a first pair of imperforate acoustically hard walls positioned immediately adjacent the opposite sides of and coextensive with at least a first portion of said blade, said walls being parallel throughout their entire area, parallel to the direction of motion of said blade and spaced apart a distance not greater than one-half of the free field wavelength of a plane propagating acoustic wave of said predetermined frequency in said medium, and extending beyond the periphery of said blade a distance not less than one and one-half times the distance between said walls, whereby said blade is exposed to a radiation impedance which is imaginary and audible noise below said selected frequency is thereby subjected to cut-off;

a second blade guard element mounted to said saw, said second element including a second pair of imperforate acoustically hard walls parallel throughout their entire area and spaced apart a distance not greater than one-half of the free field wavelength of a plane propagating acoustic wave of said predetermined frequency in said medium, said second pair of walls being positionable immediately adjacent the opposite sides of said blade, coextensive with the remaining portion of said blade and parallel to said first pair of walls, and extending beyond the periphery of said blade a distance not less than one and one-half the distance between said walls, whereby said blade is exposed to a radiation impedance which is imaginary and audible noise below said selected frequency is thereby subjected to cut-off; and means associated with said saw for so positioning said second pair of walls.

9. The industrial saw of claim 8 wherein each of said first and second pairs of walls are spaced apart a distance of from abouyt 21.5 millimeters to about 7 millimeters.

10. An acoustical guard for suppressing a portion of the aerodynamic idling noise produced by the moving saw blade of a high-speed industrial saw, said portion lying in the band of audible frequencies bounded at its upper end of some selected frequency and deemed to be harmful to human hearing, said guard comprising:

a pair of imperforate acoustically hard walls parallel throughout their entire area and spaced apart a distance not greater than one-half of the free field wavelength of a plane propagating acoustic wave at said selected frequency, said pair of walls being positionable immediately adjacent opposite sides of said blade, coextensive with said blade, oriented substantially parallel to the direction of motion of said blade, and extending beyond the periphery of said blade a distance not less than one and one-half times the distance between said walls, whereby said blade is exposed to a radiation impedance which is imaginary and audible noise below said selected frequency is thereby subjected to cut-off; and means associated with said saw for so positioning said pair of walls.

11. A high-speed industrial saw, comprising:

a saw blade producing aerodynamic idling in the band of audible frequencies bounded at its upper end by some selected frequency and deemed to be harmful to human hearing; and a blade guard element mounted to said saw, said element including a pair of imperforate acoustically hard walls parallel throughout their entire area and spaced apart a distance not greater than one-half of the free field wavelength of a plane propagating acoustic wave of said predetermined frequency, said pair of walls being positionable immediately adjacent the opposite sides of said blade, coextensive with said blade and parallel to the direction of motion of said blade, and extending beyond the periphery of said blade a distance not less than one and one-half the distance between said walls, whereby said blade is exposed to a radiation impedance which is imaginary and audible noise below said selected frequency is thereby subjected to cut-off; and means associated with said saw for so positioning said pair of walls.

* * * * *